United States Patent
Fetzer et al.

(10) Patent No.: US 7,394,301 B2
(45) Date of Patent: Jul. 1, 2008

(54) SYSTEM AND METHOD FOR DYNAMICALLY VARYING A CLOCK SIGNAL

(75) Inventors: Eric S. Fetzer, Longmont, CO (US); Samuel D. Naffziger, Fort Collins, CO (US); Benjamin J. Patella, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 14 days.

(21) Appl. No.: 11/155,064

(22) Filed: Jun. 17, 2005

(65) Prior Publication Data

US 2005/0231259 A1 Oct. 20, 2005

Related U.S. Application Data

(62) Division of application No. 10/704,252, filed on Nov. 7, 2003, now Pat. No. 6,927,605.

(51) Int. Cl.
*H03H 11/26* (2006.01)

(52) U.S. Cl. .................. 327/262; 327/269; 327/270; 327/276; 327/281

(58) Field of Classification Search .................. None
See application file for complete search history.

(56) References Cited

U.S. PATENT DOCUMENTS

| | | | | |
|---|---|---|---|---|
| 4,330,750 A * | 5/1982 | Mayor | ................. | 327/276 |
| 5,432,471 A | 7/1995 | Majumdar et al. | .......... | 327/380 |
| 5,635,868 A | 6/1997 | Aiello et al. | ................. | 327/538 |
| 5,650,737 A | 7/1997 | Eilley | ........................ | 327/108 |
| 5,867,644 A | 2/1999 | Ranson et al. | ................. | 714/39 |
| 5,880,671 A | 3/1999 | Ranson et al. | ........... | 340/146.2 |
| 6,092,030 A * | 7/2000 | Lepejian et al. | ............... | 702/79 |
| 6,127,816 A | 10/2000 | Hirst | ......................... | 323/283 |
| 6,140,856 A * | 10/2000 | Rajivan et al. | ............... | 327/276 |
| 6,144,187 A | 11/2000 | Bryson | ....................... | 320/137 |
| 6,157,231 A * | 12/2000 | Wasson | ...................... | 327/156 |
| 6,229,364 B1 * | 5/2001 | Dortu et al. | .................. | 327/158 |
| 6,336,157 B1 * | 1/2002 | Carbonaro et al. | ............ | 710/59 |
| 6,476,656 B2 * | 11/2002 | Dally et al. | .................. | 327/276 |
| 6,927,605 B2 | 8/2005 | Fetzer et al. | ................. | 327/101 |
| 7,225,349 B2 * | 5/2007 | Tam et al. | .................... | 713/322 |
| 2002/0190283 A1 * | 12/2002 | Seno et al. | .................. | 257/275 |
| 2003/0074591 A1 * | 4/2003 | McClendon et al. | ........ | 713/322 |
| 2004/0008063 A1 * | 1/2004 | Kim et al. | .................... | 327/158 |
| 2006/0232316 A1 * | 10/2006 | Nomura | ....................... | 327/291 |
| 2007/0103183 A1 * | 5/2007 | Miller | ........................ | 324/765 |

FOREIGN PATENT DOCUMENTS

JP 6-125252 * 5/1994

OTHER PUBLICATIONS

"AMD PowerNow™ Technology", Informational White Paper, Publication #24404, Issue date Nov. 2000, 18 pages.

* cited by examiner

*Primary Examiner*—Tuan T Lam

(57) ABSTRACT

According to at least one embodiment, a system comprises means for performing an operation utilizing a clock signal. The system further comprises means for supplying a variable operating voltage to the performing means, and means for dynamically varying the frequency of the clock signal responsive to observed changes in the variable operating voltage.

29 Claims, 5 Drawing Sheets

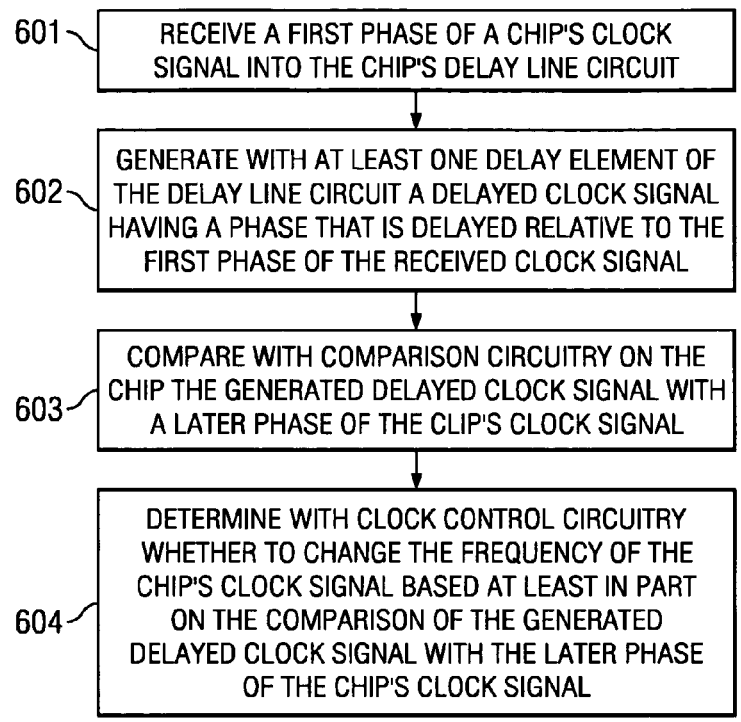
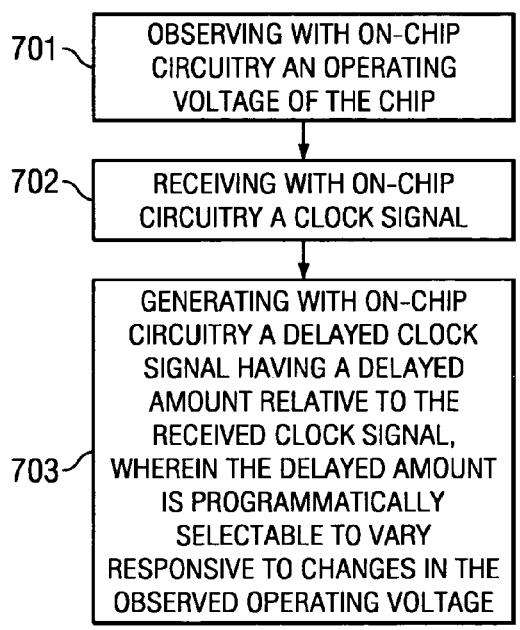
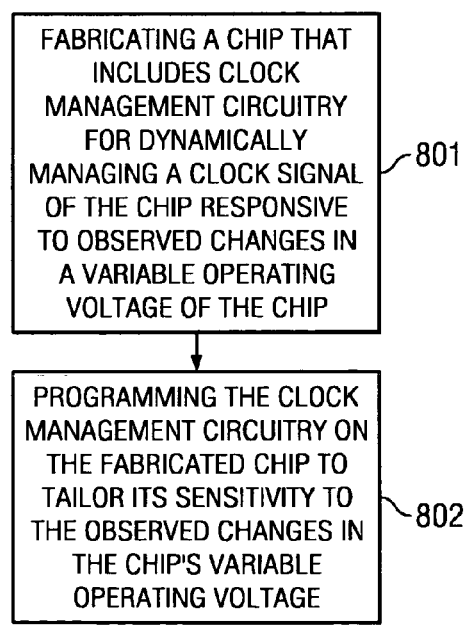

SYSTEM AND METHOD FOR DYNAMICALLY VARYING A CLOCK SIGNAL

RELATED APPLICATIONS

This application is a Divisional of U.S. patent application Ser. No. 10/704,252 filed on 11/07/2003 now U.S. Pat. No. 6,927,605, entitled "SYSTEM AND METHOD FOR DYNAMICALLY VARYING A CLOCK SIGNAL", the disclosure of which is hereby incorporated herein by reference.

BACKGROUND

Circuits, such as integrated circuits (commonly referred to as "chips") are utilized in an ever-increasing number of applications. For instance, such chips as microprocessors are commonly implemented not only in personal computers (PCs) and laptops, but are typically implemented in much smaller (and more portable) devices, such as personal digital assistants (PDAs), cellular telephones, pagers, and various other types of devices. Given the ever-increasing advances being made in the performance of chips, power consumption is increasingly becoming a concern for chip designers. For example, power consumption is becoming a serious performance limiter for high-speed microprocessors. A design objective for most microprocessor systems is to provide the highest possible peak performance for compute-intensive code, while reducing power consumption of the microprocessor system. Reduction in power consumption (at least during low performance periods) is desirable to maximize the battery life of the device, particularly when such microprocessor systems are to be implemented within portable electronic devices. Power consumption of a chip may be generally computed utilizing the following equation: $P=C*V^2*F$, wherein P represents power consumption, C represents switching capacitance, V represents operating voltage, and F represents the clock frequency of the chip. In view of such equation, switching capacitance (C), voltage (V), and frequency (F) are all factors in determining the power consumption (P) of a chip. In many cases, the processor's clock frequency (F) is limited in order to hold the power consumption (P) of a chip below a certain level that is acceptable for use in a given system (e.g., within a desktop or portable devices).

Microprocessor chips have typically been implemented with a fixed voltage and frequency determined to prevent the chip from consuming more than a particular amount of power. Typically, in designing microprocessor chips, a designer tests the chip with software code for creating a heavy computational load on the chip in order to determine the appropriate voltage and frequency that may be implemented for the chip such that its power consumption does not exceed a particular amount when heavy computational loads are encountered by the chip. However, once implemented, such heavy computational loads may be encountered relatively seldom, with low (or no) computational load being placed on the microprocessor much of the time. Accordingly, the worst-case computational loads dictate the voltage and frequency of the chip, thereby hindering performance of the chip (e.g., because of the decreased frequency required for the worst case).

One power-saving technique attempts to reduce only the clock frequency (F) during non-compute intensive activity. This reduces power, but does not affect the total energy consumed per process. That is, a reduction in frequency (F) results in a linear reduction in the power consumed, but also results in a linear increase in task run-time, which causes the energy-per-task to remain constant. On the other hand, reducing only the voltage (V) of the processor improves its energy efficiency, but compromises its peak performance.

It has been recognized that if clock frequency (F) and supply voltage (V) are dynamically varied in response to computational load demands, then energy consumed per process can be reduced for the low computational periods, while retaining peak performance when required (i.e., for heavy computational periods). Design strategies attempting to utilize such dynamic variation of clock frequency (F) and supply voltage (V) based on computational loads are commonly referred to as dynamic voltage scaling (DVS). Examples of such DVS techniques include the SpeedStep™ technology available from Intel Corporation and the PowerNOW technology available from Advanced Micro Devices, Inc. Traditional implementations use DVS on a microprocessor under direct Operating System (OS) control. In such an implementation, one or more voltage scheduler algorithms are included in the OS of a DVS system, which are utilized to dynamically adjust the processor speed and voltage at run-time of a microprocessor. The voltage schedulers control the clock frequency (F) and supply voltage (V) of a microprocessor by writing a desired frequency (in MHz) to a coprocessor register. The voltage schedulers analyze the current and past state of the system in order to predict the future workload of the processor. For example, individual applications supply a completion deadline, and the voltage scheduler uses the applications' previous execution history to determine the number of processor cycles required and sets the clock frequency (F) accordingly.

DVS techniques traditionally utilize interval-based voltage schedulers, which periodically analyze system utilization to control the frequency and voltage. As an example, if the voltage scheduler determines that the preceding time interval was greater than 50% active, it may increase the frequency and voltage for the next time interval. Thus, the system attempts to preserve the amount of power consumed by a microprocessor by having the OS dynamically adjust the clock frequency (F) to the minimum level required by the current active processes. To adjust the clock frequency (F) to such level, the OS may cause F to either be increased or decreased. To increase F, the OS first increases the chip's operating voltage (V) to a suitable amount for supporting the desired F and then F is increased, and to decrease F to a desired level, F is first decreased to such level and then the chip's operating voltage is decreased to an amount that is sufficient for supporting the reduced F.

However, such an approach that utilizes the OS to dynamically control the voltage and frequency of a microprocessor is often problematic/undesirable. First, changing a system's OS to implement such an approach is typically very time consuming and/or costly. System administrators generally dislike upgrading their OS to improve their hardware. Additionally, the OS approach is not perfectly reliable because it has imperfect information about how much power the chip is actually consuming and what its compute needs are. Rather, the OS can only attempt to estimate/guess what is needed at the chip level. Furthermore, data necessary for the OS to intelligently estimate the power consumption and/or compute needs of a chip is typically chip specific, which results in greater difficulty in implementing/upgrading such an OS approach (because the OS implementation must be tailored to a specific chip technology that is implemented).

SUMMARY

According to at least one embodiment, a system comprises means for performing an operation utilizing a clock signal.

The system further comprises means for supplying a variable operating voltage to the performing means, and means for dynamically varying the frequency of the clock signal responsive to observed changes in the variable operating voltage.

BRIEF DESCRIPTION OF THE DRAWINGS

FIG. 6 shows an example operational flow diagram for an embodiment;

FIG. 7 shows another example operational flow diagram in accordance with an embodiment; and FIG. 8 shows an example operational flow diagram for implementing on-chip clock management circuitry that is programmable in accordance with one embodiment.

DETAILED DESCRIPTION

Figure 1:
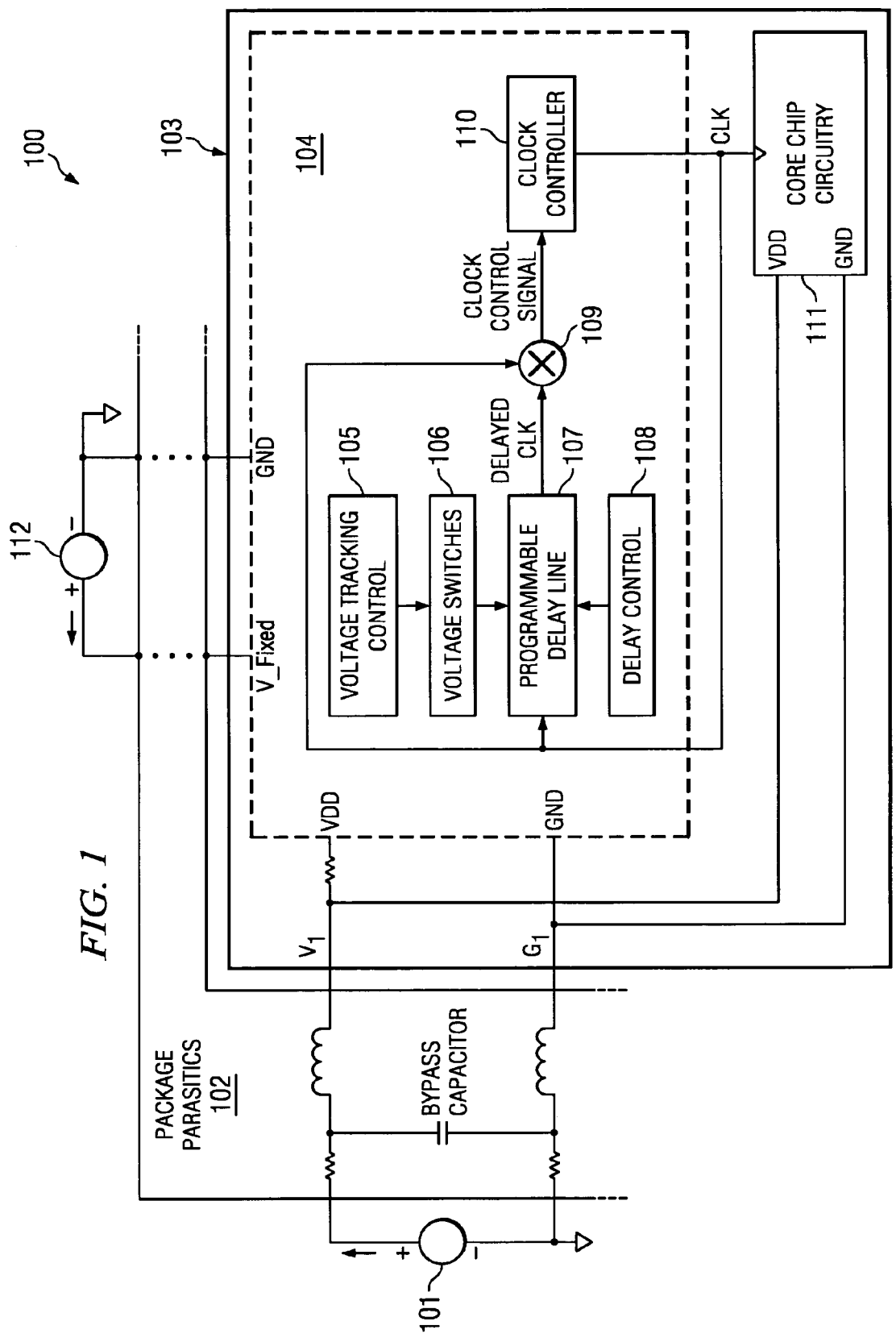
FIG. 1 shows a portion of a system that includes an example implementation of an embodiment for dynamically varying a chip's clock signal.

Turning to FIG. 1, a portion of a system 100 that includes an example implementation of an embodiment of circuitry for dynamically varying a clock signal is shown. As shown, power supply 101 supplies power to a chip 103. More specifically, a voltage signal and ground is supplied by power supply 101, which is typically fed through some package parasitics 102 to chip 103. Such package parasitics 102 are well known to those of ordinary skill in the electronic circuit arts, and therefore will not be described in great detail herein. Thus, the resulting voltage signal V1 and ground G1 are received by chip 103. Chip 103 comprises voltage-to-frequency conversion circuitry (which may be referred to herein as "clock optimization circuitry" or "clock management circuitry") 104, which is operable to dynamically vary the chip's clock CLK (that is utilized as the clock signal for the core chip circuitry 111) responsive to changes in the chip's variable voltage supply V1, as described further below. Chip 103 may be any type of integrated circuit, including without limitation a microprocessor. Core chip circuitry 111 may include any clocked circuitry components of chip 103, such as logic to execute instructions in a microprocessor, storage elements for information the chip may utilize for performing operations, arithmetic processing logic, etc.

In this example embodiment of FIG. 1, voltage-to-frequency conversion circuitry 104 includes voltage tracking control 105, voltage switches 106, programmable delay line 107, delay control 108, phase comparator 109, and clock controller 110, which are described further below. As shown, in this example embodiment clock controller 110 outputs chip clock CLK for use by core chip circuitry 111. Also, clock CLK is received by programmable delay line 107 and phase comparator 109. Programmable delay line 107 generates a delayed clock signal, shown as Delayed CLK, based on the voltage V1. Phase comparator 109 compares the clock CLK to Delayed CLK to determine whether clock controller 110 should be instructed to change the frequency of clock CLK (e.g., either increase or decrease the frequency of clock CLK). More specifically, phase comparator 109 outputs a clock control signal that identifies the result of the comparison of the phase of the clock CLK with the Delayed CLK. Based on such clock control signal, clock controller 110 determines whether to alter the frequency of clock CLK.

Thus, programmable delay line 107 generates Delayed CLK having a delay relative to CLK that varies with the chip's supply voltage V1 in a predetermined way. As discussed in conjunction with FIG. 3 below, in certain embodiments, the delay line is "programmable" such that its sensitivity to changes in the supply voltage V1 may be increased or decreased (i.e., programmed) to match circuitry in production. Before circuitry is actually fabricated, predicting how such circuitry will behave with respect to various supply voltages is difficult. Once the circuitry is actually fabricated (e.g., in silicon), certain embodiments enable delay line 107 to be programmed to accurately account for the characteristics of the fabricated circuitry (in silicon) so that voltage-to-frequency conversion circuitry 104 appropriately varies the chip's clock frequency CLK responsive to changes in the variable supply voltage V1. In an example embodiment, such as that described below in FIGS. 2A-2C, the Delayed CLK signal is configured to be one clock cycle long. So, the chip's clock signal CLK is input to the delay line circuitry 107, which outputs Delayed CLK that is expected to be exactly one clock cycle later. Thus, the Delayed CLK may be compared with a next cycle of the chip's clock CLK, by phase comparator 109, to determine whether the frequency of CLK is proper given the chip's operating voltage.

As shown in FIG. 1, in this example embodiment, the received voltage signal V1 and ground signal G1 are fed both to core chip circuitry 111 and voltage-to-frequency conversion circuitry 104. In such embodiment, voltage-to-frequency conversion circuitry 104 adjusts the frequency of clock CLK generated thereby based, at least in part, on the value of voltage V1. More specifically, V1 is a variable supply voltage (also referred to as "variable_supply" herein) that is supplied to chip 103, and power supply 112 supplies a fixed voltage signal, V_fixed, to chip 103 in the manner shown in FIG. 1. As shown, both the variable voltage supply V1 and the fixed voltage supply V_fixed are supplied to voltage-to-frequency conversion circuitry 104, and as discussed further with FIG. 5 below, such V1 and V_fixed signals are used by delay elements in programmable delay line 107 for managing the chip's clock signal CLK.

Voltage switches 106 are switches that are controlled via programming (e.g., via voltage tracking control 105) to adjust the sensitivity of programmable delay line circuitry 107 to variances in the chip's supply voltage V1. Such voltage switches 106 are effectively an analog multiplexer ("MUX"). In operation, voltage switches 106 either send to programmable delay line 107 fixed voltage V_fixed (such that the delay of the generated Delayed CLK is insensitive to changes in the chip's variable voltage supply V1) or the chip's variable voltage V1. Thus, if the chip's variable supply voltage V1 is sent to the programmable delay line 107 (e.g., is sent to a transfer gate of a delay element of delay line circuitry 107, as described below in conjunction with FIG. 5), as that supply voltage V1 varies, the delay of the generated Delay CLK either increases or decreases. Thus, if a voltage droop is encountered, then instead of being exactly one clock cycle behind the CLK signal, the generated Delayed CLK will take a little longer. In that case, phase comparator 109 will detect that the Delayed CLK took longer than a clock cycle of the CLK, and it will send a signal to clock controller 110 to reduce the frequency of CLK.

The above-described comparison of CLK with the Delayed CLK by phase comparator 109 and altering the frequency of CLK by clock controller 110 preferably occurs very quickly (e.g., in approximately 300 picoseconds). The amount that the chip's supply voltage can drift during that time (e.g., in 300 picoseconds) is very, very small. Thus, the voltage-to-frequency conversion circuitry 104 does not allow the chip to encounter a condition in which it fails due to the supply voltage dropping more quickly than the clock frequency that is supported by such supply voltage is reduced. Rather, voltage-to-frequency conversion circuitry 104 very quickly recognizes changes in the chip's supply voltage V1 to enable the frequency of the chip's clock CLK to be adjusted accordingly. Therefore, very small guard banding may be implemented for chip 103.

In other words, the chip's supply voltage V1 moves very slowly compared to the speed at which the voltage-to-frequency conversion circuitry 104 detects and responds to changes in the supply voltage V1 (e.g., by adjusting the frequency of CLK appropriately). Thus, the voltage-to-frequency conversion circuitry 104 enables a safe operating range to be maintained for chip 103 by quickly adjusting the frequency of CLK responsive to changes in the chip's supply voltage V1 in order to keep the clock CLK at a frequency that is supported by the chip's supply voltage V1.

Accordingly, voltage-to-frequency conversion circuitry 104 is operable to dynamically adjust the frequency of clock CLK based on variable supply voltage V1. Changes in supply voltage V1 may be encountered during the chip's operation as a result of a changing load (parasitic drop) or from a chip or system controller, as examples. For instance, as voltage V1 decreases, the frequency of CLK output by voltage-to-frequency conversion circuitry 104 decreases (so that the clock frequency is supported by the decreased supply voltage), and as voltage V1 increases, the frequency of CLK output by voltage-to-frequency conversion circuitry 104 increases (such that the clock frequency takes advantage of the increased supply voltage).

As a result, on-chip circuitry 104 of this example embodiment allows for chip 103 to self-regulate its power consumption. It will be recalled that the power consumption of chip 103 may be computed utilizing the equation $P=C*V^2*F$, wherein P represents power consumption, C represents switching capacitance, V represents operating voltage (e.g., voltage V1), and F represents the clock frequency of chip 103 (e.g., frequency of CLK). Thus, by voltage-to-frequency conversion circuitry 104 dynamically adjusting the clock frequency of chip 103 (i.e., the frequency of CLK) in response to changes in the variable voltage supply V1, the chip may self-regulate its power consumption.

In operation of the example embodiment of FIG. 1, the system clock (or "chip clock") CLK, which is output by voltage-to-frequency conversion circuitry 104 (and particularly by clock controller 110) is input to core chip circuitry 111 and is used for the clocked operations performed thereby. Additionally, clock CLK is input to voltage-to-frequency conversion circuitry 104. More specifically, clock CLK is input to programmable delay line 107 and to phase comparator 109. As described further below in conjunction with FIGS. 3-5, in certain embodiments programmable delay line 107 may include bypassable delay elements, and the delay may be programmed to be the target period of clock CLK at the target voltage V1. The target voltage and clock frequency may be obtained, for example, from chip specifications.

If the voltage V1 is at target and the clock period for clock CLK is at target, the delayed clock output by delay line 107, shown as "Delayed CLK" in FIG. 1, will have a rising edge matching that of the system clock CLK of the next clock cycle. Phase comparator 109 would therefore detect a match between the Delayed CLK and the next clock cycle of clock CLK, and the system clock controller 110 would be instructed (by the clock control signal output by phase comparator 109) to do nothing (i.e., do not change the frequency of clock CLK). If the variable supply voltage V1 is higher than the target, the delayed clock, Delayed CLK, will arrive at phase comparator 109 before the next cycle of system clock CLK, and the clock controller 110 will be signaled (by the clock control signal output by phase comparator 109) to increase the frequency of clock CLK. If the voltage V1 is lower than the target, the delayed clock, Delayed CLK, will arrive at phase comparator 109 after the next cycle of system clock CLK, and the clock controller 110 will be signaled (by the clock control signal output by phase comparator 109) to decrease the frequency of clock CLK. Example delay elements that can be programmed to vary the Delayed CLK responsive to the observed operating voltage V1 in this manner is described further below in conjunction with FIGS. 3-5.

Voltage switches 106 allow the programmable delay line 107 to have different responses to voltage variation. By effectively MUXing in a fixed supply, V_fixed, to some delay elements of programmable delay line 107, as described further with FIGS. 3 and 5 below, the delay line 107 will be less responsive to voltage variation. Using such voltage switches 106, the amount of response of delay line 107 to variation of voltage V1 may be set, for example, to match that of the critical path on the die of chip 103.

Figure 2A:
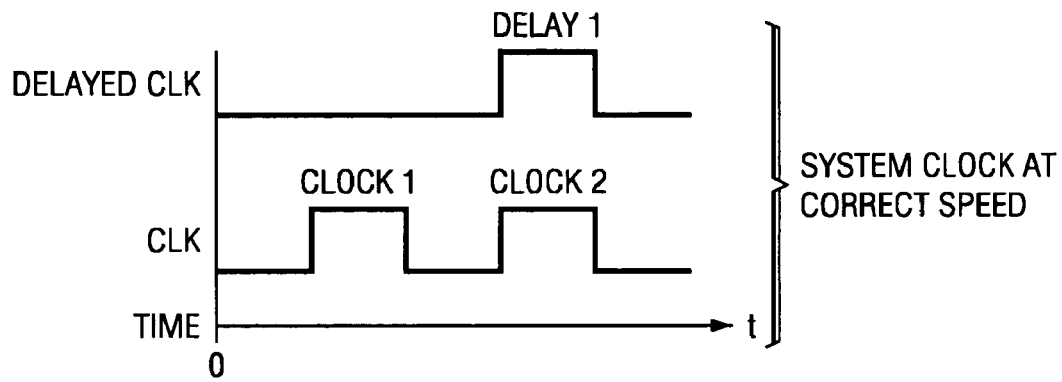
FIGS. 2A-2C show example scenarios that may be encountered when comparing a chip's clock signal with a delayed clock signal in accordance with an embodiment of a voltage-to-frequency converter for managing the chip's clock signal.
Figure 2B:
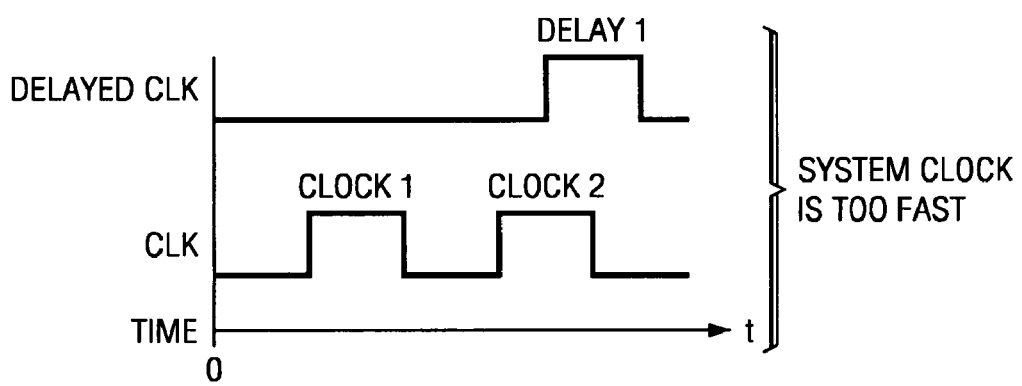
Figure 2C:
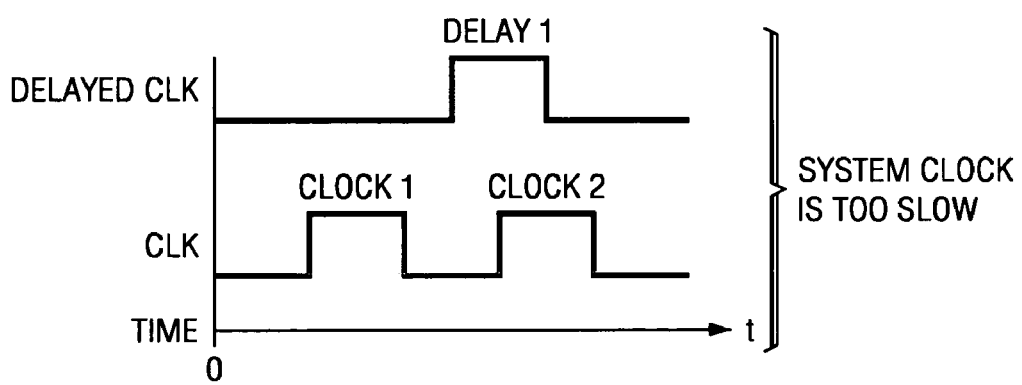

FIGS. 2A-2C show example scenarios that may be encountered by phase comparator 109 in comparing clock CLK with Delayed CLK. For instance, FIG. 2A shows an example in which a phase, Delay 1, of Delayed CLK matches the phase Clock 2 of clock CLK. For instance, the phase "Clock 1" of clock CLK is a first clock cycle output by clock control 110. Such "Clock 1" is received by programmable delay line 107, which outputs phase Delay 1 of Delayed CLK. Clock control 110 then outputs a second clock cycle "Clock 2" of clock CLK. Phase comparator 109 receives CLK and Delayed CLK, and compares the phase Delay 1 of Delayed CLK with the phase Clock 2 of CLK. In the example of FIG. 2A, the clock control signal output by phase comparator 109 indicates that the Delayed CLK and CLK match, and thus clock controller 110 determines that the system clock CLK is at the correct speed and does not change its frequency. That is, given the supply voltage V1 to the chip's core circuitry 111, it is determined that the chip's clock CLK is operating at the correct (or "optimum") frequency.

FIG. 2B shows an example in which a phase, Delay 1, of Delayed CLK occurs after the phase Clock 2 of clock CLK. For instance, the clock cycle "Clock 1" of CLK is first output by clock control 110. Such "Clock 1" is received by programmable delay line 107, which outputs phase Delay 1 of Delayed CLK. Clock control 110 then outputs second clock cycle "Clock 2" of CLK. Phase comparator 109 receives CLK and Delayed CLK, and compares the phase Delay 1 of Delayed CLK with the phase of second clock cycle "Clock 2" of CLK. In the example of FIG. 2B, the clock control signal output by phase comparator 109 indicates that the phase of Delayed CLK is behind the phase of CLK (i.e., phase Delay 1 of Delayed CLK occurs after phase Clock 2 of CLK), and thus clock controller 110 determines that the system clock CLK is too fast and may therefore reduce its frequency.

FIG. 2C shows an example in which a phase, Delay 1, of Delayed CLK occurs before the phase of second clock cycle "Clock 2" of CLK. For instance, a first clock cycle "Clock 1" of CLK is first output by clock control 110. Such "Clock 1" is received by programmable delay line 107, which outputs phase Delay 1 of Delayed CLK. Clock control 110 then outputs second clock cycle "Clock 2" of CLK. Phase comparator 109 receives CLK and Delayed CLK, and compares the phase Delay 1 of Delayed CLK with the phase of second clock cycle "Clock 2" of CLK. In the example of FIG. 2C, the clock control signal output by phase comparator 109 indicates that the phase of Delayed CLK is ahead of the phase of CLK (i.e., phase Delay 1 of Delayed CLK occurs before phase Clock 2 of CLK), and thus clock controller 110 determines that the system clock CLK is too slow and may therefore increase its frequency.

In view of the above, phase comparator 109 may be implemented to determine the following conditions: 1) if CLK's rising edge is later than the Delayed CLK's rising edge plus a delta; 2) if the Delayed CLK's rising edge is later than the CLK's rising edge plus a delta; and 3) if neither of the first two conditions are true (i.e., the rising edges of Delayed CLK and CLK match within the specified deltas). If the first condition is satisfied, the phase comparator 109 outputs a signal to cause clock control circuitry 110 to speed up CLK. If the second condition is satisfied, the phase comparator 109 outputs a signal to cause clock control circuitry 110 to slow down CLK. And, if the third condition is detected (i.e., neither of the first two conditions are true), the phase comparator 109 does not cause clock control circuitry 110 to change CLK at all.

As one example implementation of phase comparator 109, it may include Set-Reset ("S-R") latch circuitry that is used for determining if the first condition identified above is true (i.e., if CLK's rising edge is later than the Delayed CLK's rising edge plus a delta). Similarly, the phase comparator 109 may include S-R latch circuitry that is used for determining if the second condition identified above is true (i.e., if the Delayed CLK's rising edge is later than the CLK's rising edge plus a delta). And, phase comparator 109 may include a combinational gate for detecting the third condition identified above (i.e., the rising edges of Delayed CLK and CLK match within the specified deltas). Of course, any other circuitry now known or later developed for performing the above-described function of phase comparator 109 may be used in implementing phase comparator 109 in alternative embodiments.

Figure 3:
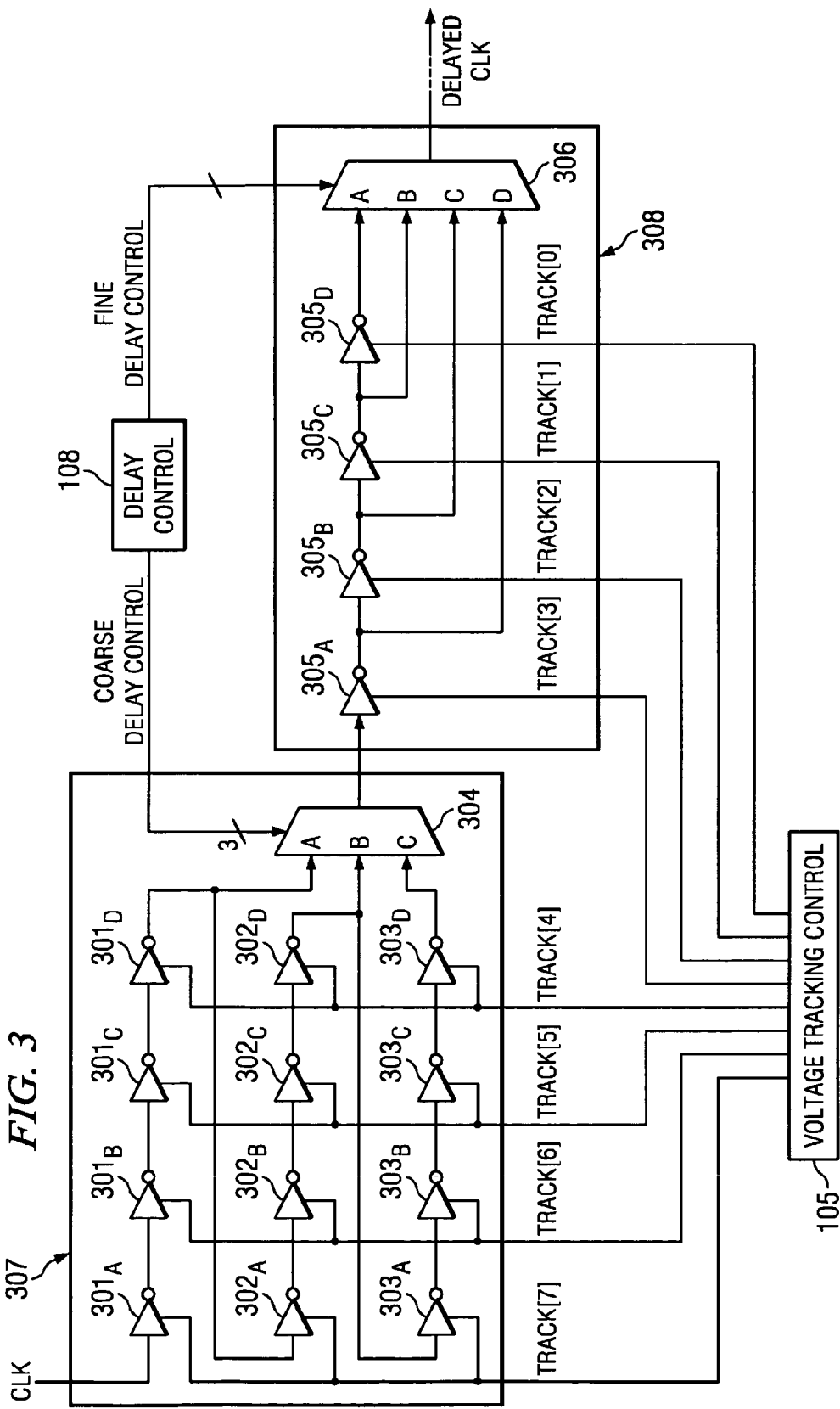
FIG. 3 shows an example implementation of a portion of the voltage-to-frequency converter of FIG. 1 in accordance with one embodiment.

FIG. 3 shows an example implementation of a portion of voltage-to-frequency converter 104 of FIG. 1 in accordance with one embodiment. In this example implementation, a plurality of delay elements are arranged to form the programmable delay line 107 of FIG. 1. More specifically, delay elements $301_{A-D}$, $302_{A-D}$, $303_{A-D}$, and $305_{A-D}$ are shown in FIG. 3. Also included in the example of FIG. 3 are multiplexers (MUXes) 304 and 306, which are controlled by delay control circuitry 108 via a Coarse Delay Control signal and Fine Delay Control signal, respectively. This example implementation has a first part 307 (referred to herein as a Coarse Delay stage) that provides coarse control over the delayed clock signal to be generated, and a second part 308 (referred to herein as a Fine Delay stage) that provides fine control over the delayed clock signal to be generated. Delay elements $301_{A-D}$, $302_{A-D}$, and $303_{A-D}$, along with MUX 304 form the Coarse Delay stage 307, and delay elements $305_{A-D}$ and MUX 306 form the Fine Delay stage 308 in this example of FIG. 3.

As further shown in FIG. 3, voltage tracking control 105 outputs an 8-bit track signal, track[7:0], in this example, wherein each bit is input to one or more of the delay elements. More specifically, track[7] (i.e., the most significant bit of the track signal) is input to delay elements $301_A$, $302_A$, and $303_A$ of the Coarse Delay stage 307; track[6] is input to delay elements $301_B$, $302_B$, and $303_B$ of the Coarse Delay stage 307; track[5] is input to delay elements $301_C$, $302_C$, and $303_C$ of the Coarse Delay stage 307; and track[4] is input to delay elements $301_D$, $302_D$, and $303_D$ of the Coarse Delay stage 307. Track[3] is input to delay element $305_A$ of the Fine Delay stage 308; track[2] is input to delay element $305_B$ of the Fine Delay stage 308; track[1] is input to delay element $305c$ of the Fine Delay stage 308; and track[0] (i.e., the least significant bit of the track signal) is input to delay element $305_D$ of the Fine Delay stage 308.

As described further with FIG. 5 below, if the track signal is set high (to a logical 1) for a delay element, thus putting the delay element into tracking mode, the amount of the delay of a signal output by the delay element varies responsive to the chip's variable voltage V1. On the other hand, if the track signal is set low (to a logical 0) for a delay element, the amount of the delay of a signal output by the delay element does not vary responsive to the chip's variable voltage V1. Accordingly, voltage tracking control 105 may output an appropriate value for each bit of the track signal to selectively place certain ones of the delay elements into tracking mode to achieve a desired level of sensitivity of the Delayed CLK signal relative to the chip's variable voltage supply V1.

As shown in the example implementation of FIG. 3, the chip's clock signal, CLK, is input to a first delay element $301_A$, which contributes some amount of delay (i.e., gate delay) to the CLK signal in its resulting output signal. That is, the first delay element $301_A$ generates an output signal having some amount of delay relative to the CLK signal. The output of first delay element $301_A$ is input to second delay element $301_B$, which generates an output that is further delayed relative to the CLK signal. The output of second delay element $301_B$ is input to third delay element $301c$, which generates an output that is further delayed relative to the CLK signal, and the output of third delay element $301_C$ is input to fourth delay element $301_D$, which generates an output that is further delayed relative to the CLK signal. The output from fourth delay element 301D is input as a first input "A" to MUX 304, and it is also input to delay element $302_A$. Accordingly, the CLK signal is input to a first series of delay elements, elements $301_A$-$301_D$, which generate a first output signal having a first delay relative to the CLK signal.

The output signal from delay element $301_D$ is input to a second series of delay elements $302_A$-$302_D$, which generate a second output signal (from delay element $302_D$) having a greater delay relative to the CLK signal than the output signal from delay element $301_D$. The output signal generated by delay element $302_D$ is input as a second input "B" to MUX 304, and it is also input to delay element $303_A$.

The output signal from delay element $302_D$ is input to a third series of delay elements $303_A$-$303_D$, which generate a third output signal (from delay element $303_D$) having a greater delay relative to the CLK signal than the output signal from delay element $302_D$. The output signal generated by delay element $303_D$ is input as a third input "C" to MUX 304.

Accordingly, the CLK signal is input to a first series of delay elements, elements $301_A$-$302_D$, which generate a first output signal having a first delay relative to the CLK signal. The first output signal is input as input A to MUX 304 and is also input to a second series of delay elements, elements $302_A$-$302_D$, which generate a second output signal having a second delay relative to the CLK signal. The second output signal is input as input B to MUX 304 and is also input to a third series of delay elements, elements $303_A$-$303_D$, which generate a third output signal having a third delay relative to the CLK signal. The third output signal is input as input C to MUX 304. Either of the first, second, or third output signals may be selected by the Coarse Delay Control signal as the signal to be output by MUX 304 for the Coarse Delay stage 307.

The output from Coarse Delay stage 307 is input to Fine Delay stage 308. More specifically, the output signal from MUX 304 of Coarse Delay stage 307 is input to a first delay element $305_A$ of Fine Delay stage 308. Delay element $305_A$ generates an output signal having some amount of delay relative to the CLK signal. The output of delay element $305_A$ is input as input "D" to MUX 306 and is also input to a second delay element 305B of Fine Delay stage 308. Delay element 305B generates an output signal having a further delay relative to the CLK signal, which is input as input "C" to MUX 306 and is also input to a third delay element $305_C$ of Fine Delay stage 308. Delay element $305_C$ generates an output signal having a further delay relative to the CLK signal, which is input as input "B" to MUX 306 and is also input to a fourth delay element $305_D$ of Fine Delay stage 308. Delay element $305_D$ generates an output signal having a further delay relative to the CLK signal, which is input as input "A" to MUX 306. Either of the A, B, C, or D input signals of MUX 306 may be selected by the Fine Delay Control signal as the signal to be output by MUX 306 as the delayed CLK signal.

While four delay elements are shown in each series of the Coarse Delay stage 307 and four delay elements are shown in the Fine Delay stage 308 in this example implementation, in other embodiments any number of delay elements desired for providing different amounts of delay may be implemented at each stage. Further, while three series of delay elements are shown in Coarse Delay stage 307, in other embodiments any number of series of delay elements desired for providing different amounts of delay may be implemented at such Coarse Delay stage 307.

Further, this embodiment enables the delayed CLK signal generated by the selected delay elements to be dynamically varied based on the chip's operating voltage V1. For instance, suppose that output B from MUX 304 is selected for output by Coarse Delay Control and output A from MUX 306 is selected for output by Fine Delay Control, the delayed CLK signal has a delay resulting from 12 delay elements (i.e., delay elements $301_{A-D}$, $302_{A-D}$, and $305_{A-D}$). In this example case, the delay from the 12 delay elements is selected to match the phase of the target clock cycle for CLK (e.g., the phase of a 2 GHz clock signal). Such delayed CLK signal output by the delay elements can be dynamically varied based on the chip's operating voltage V1. More specifically, a tracking signal output by voltage tracking control 105 is used for programmatically controlling for each delay element whether it is sensitive to changes in the chip's operating voltage V1. By programming a greater number of the delay elements that are involved in generating the delayed CLK signal to be dynamically variable responsive to the chip's operating voltage V1, the sensitivity of the delayed CLK signal to changes in the chip's operating voltage can be controlled, as illustrated with the graph of FIG. 4 described below.

Figure 4:
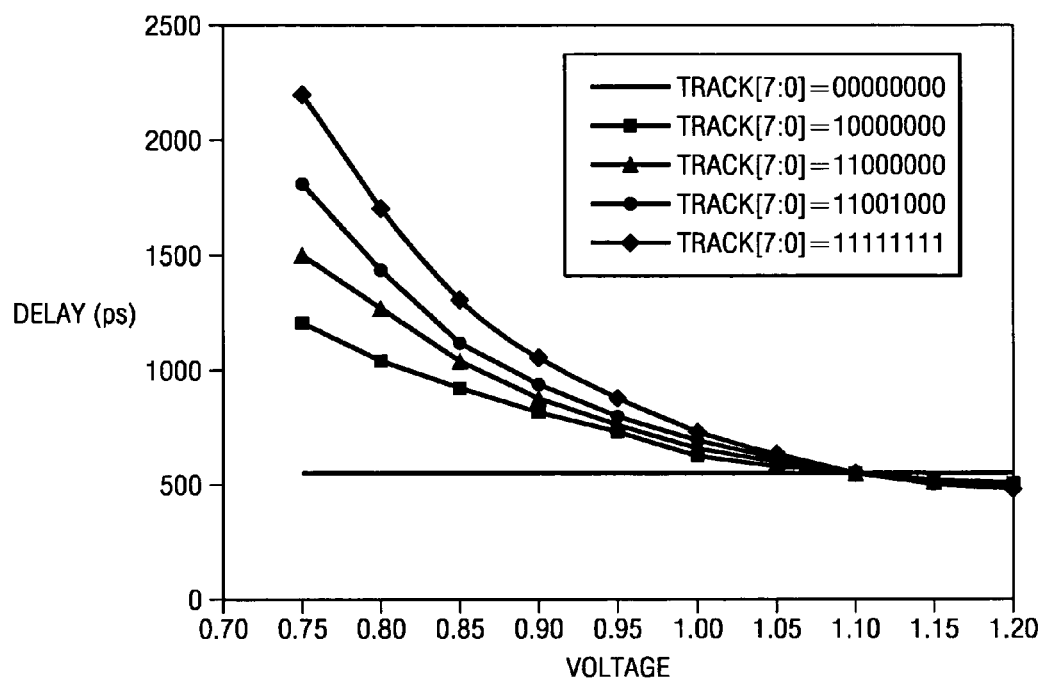
FIG. 4 shows a graph illustrating the sensitivity of delay produced by the example circuitry of FIG. 3 for various different track signal settings in accordance with one embodiment.

FIG. 4 shows a graph illustrating the sensitivity of delay produced by the example circuitry of FIG. 3 for various different track signal settings in accordance with one embodiment. More specifically, FIG. 4 shows 5 curves, each corresponding to a different track signal setting. The curves plot the amount of delay that is generated for the delayed CLK signal by the example delay line circuitry of FIG. 3 across various different operating voltage (V1) values of the chip for 5 different track signal settings. In this example, V_fixed for the chip is 1.1 volts. Depending on the setting of the track signal setting, the amount of the delay generated for the delayed CLK signal may change as the chip's operating voltage V1 drops below or rises about the V_fixed value (1.1 volts in this example). All of the curves provide the same delay when the chip's operating voltage V1 is at 1.1 volts (V_fixed).

By selectively setting appropriate bits of the track signal, the amount of delay that is to be generated by the circuitry of FIG. 3 for a particular value of the chip's operating voltage V1 can be tuned. For instance, as shown by one of the curves in the graph of FIG. 4, when the track signal has all of its bits set to 0 (i.e., track[7:0]=00000000), a constant delay is provided for the delayed CLK across the various different V1. Thus, when tracking mode is disabled for all of the delay elements of the circuitry of FIG. 3, such delay line circuitry is insensitive to changes in the chip's operating voltage V1, and produces a constant delay for delayed CLK across the various operating voltages shown.

A second curve shown in the graph of FIG. 4 corresponds to the amount of delay generated across different operating voltages when the track signal has its most significant bit set (i.e., track[7:0]=10000000). In the circuitry of FIG. 3 this activates tracking mode for delay elements $301_A$, $302_A$, and $303_A$. In this case, the delay is somewhat sensitive to changes in the chip's operating voltage, as shown by the corresponding curve in FIG. 4.

A third curve shown in the graph of FIG. 4 corresponds to the amount of delay generated across different operating voltages when track[7:0]=11000000. In the circuitry of FIG. 3 this activates tracking mode for delay elements $301_A$, $302_A$, $303_A$, $301_B$, $302_B$, and $303_B$. In this case, the delay is more sensitive to changes in the chip's operating voltage than when track[7:0]=10000000, as shown by the corresponding curve in FIG. 4.

A fourth curve shown in the graph of FIG. 4 corresponds to the amount of delay generated across different operating voltages when track[7:0]=11001000. In the circuitry of FIG. 3 this activates tracking mode for delay elements $301_A$, $302_A$, $303_A$, $301_B$, $302_B$, $303_B$ of Coarse Delay stage 307, and it activates tracking mode for delay element $305_A$ of Fine Delay stage 308. In this case, the delay is more sensitive to changes in the chip's operating voltage than when track[7:0]=11000000, as shown by the corresponding curve in FIG. 4.

A fifth curve shown in the graph of FIG. 4 corresponds to the amount of delay generated across different operating voltages when all bits of the track signal are set to 1 (i.e., track[7:0]=11111111). In the circuitry of FIG. 3 this activates tracking mode for all of the delay elements $301_{A-D}$, $302_{A-D}$, $303_{A-D}$, and $305_{A-D}$. In this case, the delay is very sensitive to changes in the chip's operating voltage, as shown by the corresponding curve in FIG. 4.

Figure 5:
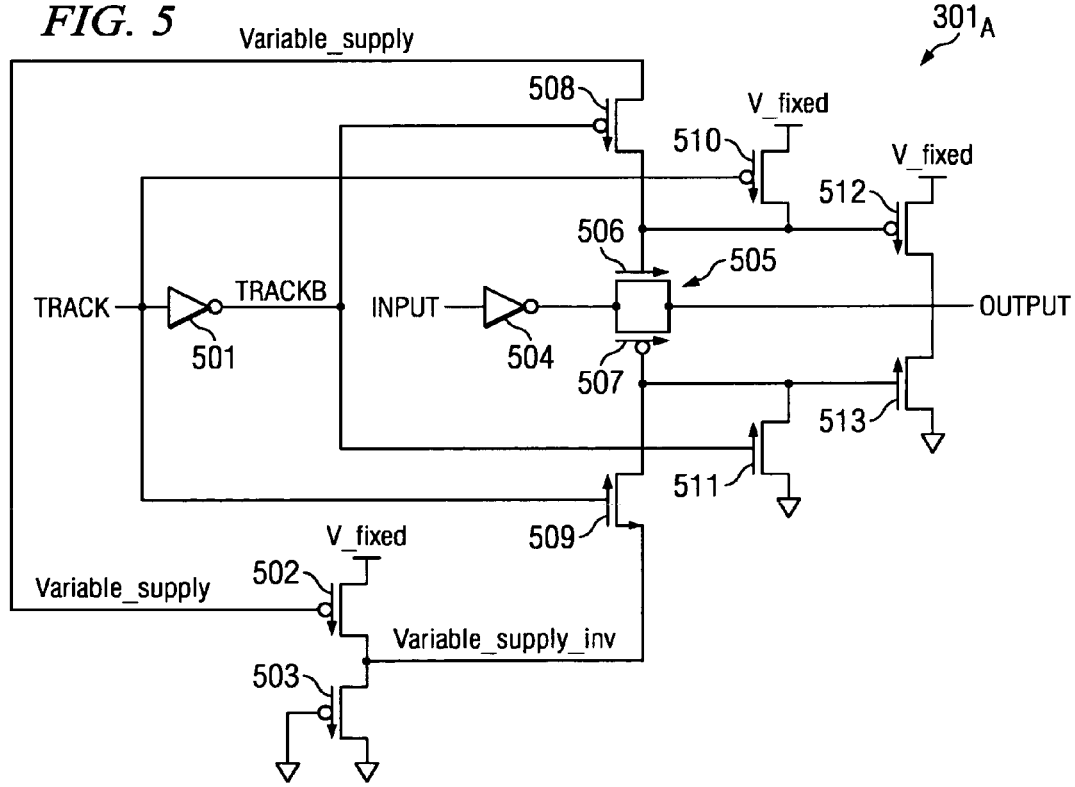
FIG. 5 shows an example implementation of a delay element of the voltage-to-frequency converter of FIG. 3 in accordance with one embodiment.

Turning to FIG. 5, an example implementation of a delay circuit, such as a single delay element of FIG. 3, in accordance with one embodiment is shown. More specifically, FIG. 5 shows an example implementation of delay element $301_A$, wherein each of the other delay elements $301_{B-D}$, $302_{A-D}$, $303_{A-D}$, $305_{A-D}$ of FIG. 3 may be implemented in a like manner. As described further below, this example implementation of delay element $301_A$ includes inverters 501 and 504, pFETs (p-type Field Effect Transistors) 502, 503, 507, 508, 510, and 512, and nFETs (n-type Field Effect Transistors) 506, 509, 511, and 513. Such inverters, pFETs, and nFETs are well known in the art. In general, in a FET, current flows along a semiconductor path called the channel. At one end of the channel, there is an electrode called the source. At the other end of the channel, there is an electrode called the drain. The physical diameter of the channel is fixed, but its effective electrical diameter can be varied by the application of a voltage to a control electrode called the gate. The conductivity of the FET depends, at any given instant in time, on the electrical diameter of the channel. A small change in gate voltage can cause a large variation in the current from the source to the drain. In other words, the resistance of the FET may be varied by varying the voltage applied to its gate.

Inverter 501 receives the "track" signal as input, and it outputs signal "trackb". The "track" signal corresponds to the bit of the track signal that is input to this delay element $301_A$, as described with FIG. 3 above (i.e., track[7] is described in this example as being input to delay element $301_A$). As described above, the "track" bit received by the delay element is used for activating the tracking mode of the delay element, if so desired.

Inverter 504 receives a signal "input," which is the chip's clock signal, CLK, as shown in FIG. 3. That is, the "input" signal to inverter 504 of delay element $301_A$ is the chip's clock signal CLK. Of course, as shown in FIG. 3, the input to other delay elements is the output of a previous delay element. For instance, such inverter 504 of delay element $301_B$ in FIG. 3 would receive the "output" signal from delay element $301_A$ (i.e., the signal labeled "output" for delay element $301_A$ in FIG. 5).

Additionally, pFETs 502 and 503 effectively provide an analog inverter that receives signal "variable_supply" (which is also referred to as "V1" herein) and outputs "variable_supply_inv." Variable_supply (or "V1") is a variable voltage supply that is supplied to the chip's core circuitry, as discussed above with FIG. 1. As shown, a fixed voltage supply, which is referred to herein as a reference supply and is shown as V_fixed in FIG. 5, is also supplied to portions of delay element $301_A$. In one example implementation, as described with FIG. 4 above, the voltage of V_fixed is 1.1 volts and ground ("GND") is 0 volts, and the variable_supply may vary between 0.75 volts and 1.2 volts. Of course, in other implementations, the values of V_fixed and GND may be set to any suitable values for the circuitry. The arrangement of NFET 502 and pFET 503 provide an analog inverter such that if, for example, variable_supply is 200 millivolts below the fixed supply V_fixed, the variable_supply_inv is 200 millivolts above GND. More particularly, the grounded-gate pFET 503 acts like a resistor and pFET 502 acts like a regular pFET so that as the value of variable_supply goes down away from V_fixed, the variable_supply_inv goes up away from GND. So, pFETs 502 and 503 provide an analog inversion, wherein the change in the output, variable_supply_inv, is proportional to the change in the input, variable_supply.

Also, NFET 506 and pFET 507 are arranged to effectively provide a transfer gate 505. As described further below, the effective resistance across transfer gate 505 controls the amount of delay imparted to the output signal. The effective resistance across transfer gate 505 is controlled by the inputs to the gates of nFET 506 and pFET 507.

As described further below, delay element $301_A$ operates in one of two different ways depending on whether tracking mode is active for such delay element $301_A$ (i.e., depending on the value of the "track" signal bit that is input to the delay element). In this example, if the delay element's track bit is set low (i.e., to a logical 0), then tracking mode is inactive for such delay element $301_A$. In this case, V_fixed is provided to the gate of nFET 506 of transfer gate 505 and ground ("GND") is provided to the gate of pFET 507 of transfer gate 505. On the other hand, if the delay element's track bit is set high (i.e., to a logical 1), then tracking mode is active for such delay element $301_A$, wherein variable_supply is provided to the gate of nFET 506 of transfer gate 505 and variable_supply_inv is provided to the gate of pFET 507 of transfer gate 505. The resistance across pass gate 505 varies depending on the inputs to the gates of nFET 506 and pFET 507. Accordingly, when tracking mode is active, the variable_supply and variable_supply_inv signals control the resistance of transfer gate 505, thus controlling the amount of delay of the output signal. More specifically, in this arrangement, the lower the variable_supply signal, the greater the amount that the output signal is delayed. Otherwise, when tracking mode is inactive, V_fixed and GND control the resistance of transfer gate 505 such that it remains constant, thus not varying the delay of the output signal of such delay element $301_A$.

Considering the operation of this example implementation of delay element $301_A$ further, suppose its track bit is set low (i.e., to a logical 0) so that tracking mode is inactive for this delay element $301_A$. In this case, the trackb signal output by inverter 501 is high (i.e., a logical 1). The track bit signal, which is low, is provided to the gate of pFET 510, thus effectively turning on (or closing the switch of) such pFET 510, and the trackb signal is provided to the gate of pFET 508, thus effectively turning off (or opening the switch of) such pFET 508. Accordingly, V_fixed is provided via pFET 510 to the gate of nFET 506 of transfer gate 505. Additionally, the track bit signal is provided to the gate of nFET 509, thus effectively turning off the current flow through such NFET 509, and the trackb signal is provided to the gate of nFET 511, thus effectively turning on the current flow through such pFET 511. Accordingly, ground ("GND") is provided via nFET 511 to the gate of pFET 507 of transfer gate 505. Therefore, when tracking mode is inactive, V_fixed and GND control the resistance of transfer gate 505 such that it remains constant, thus not varying the delay of the output signal of delay element $301_A$.

Suppose now that the track bit is set high (i.e., to a logical 1) so that tracking mode is active for delay element $301_A$. In this case, the trackb signal output by inverter 501 is low (i.e., a logical 0). The track bit signal, which is high, is provided to the gate of pFET 510, thus effectively turning off such pFET 510, and the trackb signal is provided to the gate of pFET 508, thus effectively turning on such pFET 508. Accordingly, variable_supply is provided via pFET 508 to the gate of NFET 506 of transfer gate 505. Additionally, the track bit signal is provided to the gate of nFET 509, thus effectively turning on such nFET 509, and the trackb signal is provided to the gate of nFET 511, thus effectively turning off such pFET 511. Accordingly, variable_supply_inv is provided via nFET 509 to the gate of pFET 507 of transfer gate 505. As mentioned above, in this arrangement the delay imposed by transfer gate 505 on the output signal becomes longer as the variable_supply decreases. More specifically, the lower the supply to the gate of nFET 506 and the higher the negative (or ground) supply to the gate of pFET 507, the slower data goes from "input" to "output" in delay element $301_A$ (i.e., the effective resistance of transfer gate 505 is increased).

This example implementation further includes pFET 512 and nFET 513, which operate to further delay the output of transfer gate 505 by drive-fighting against the output of inverter 504. For example, when tracking is inactive for delay element $301_A$, the trackb signal is high (i.e., logical 1), which turns on nFET 511 to supply GND to the gate of pFET 507, as described above. This also causes GND to be supplied via nFET 511 to the gate of nFET 513, which effectively turns off (or opens the switch of) nFET 513 such that it has no effect on the output. Also, when tracking is inactive, the track bit signal is low (i.e., logical 0), which turns on pFET 510 to supply V_fixed to the gate of nFET 506, as described above. This also causes V_fixed to be supplied via pFET 510 to the gate of pFET 512, which effectively turns off (or opens the switch of) pFET 512 such that it has no effect on the output.

If, on the other hand, tracking is active for delay element 301$_A$, the trackb signal is low (i.e., logical 0), which turns off (or opens the switch of) nFET 511. The track bit signal is high, which turns on (or closes the switch of) NFET 509 to supply variable_supply_inv to the gate of pFET 507, as described above. This also causes variable_supply_inv to be supplied via nFET 509 to the gate of nFET 513. As described above, when variable_supply is lower than V_fixed, the variable_supply_inv is higher than GND, and such variable_supply_inv may cause nFET 513 to turn partially on as the variable_supply_inv increases above GND. Similarly, because the track bit signal is high, the trackb signal is low which turns on pFET 508 to supply variable_supply to the gate of nFET 506, as described above. This also causes variable_supply to be supplied via pFET 508 to the gate of pFET 512, which partially turns on such pFET 512. Thus, when tracking is active, the output signal from transfer gate 505 is further delayed by pFET 512 and nFET 513 drive-fighting against it.

FIG. 6 shows an operational flow diagram for on-chip clock management circuitry, such as the voltage-to-frequency conversion circuitry 104 of FIG. 1, in accordance with one embodiment. In operational block 601, a first phase of a chip's clock signal CLK is received into the chip's delay line circuit 107. In operational block 602, at least one delay element, such as delay element 301$_A$ of FIGS. 3 and 5, of the delay line circuit 107 generates a delayed clock signal, delayed CLK, having a phase that is delayed relative to the first phase of the received CLK signal. In operational block 603, the chip's comparison circuitry 109 compares the generated delayed CLK signal with a later phase of the chip's CLK signal (i.e., a phase of CLK that is later in time than the received first phase of such CLK signal). In operational block 604, the chip's clock control circuitry 110 determines whether to change the frequency of the chip's CLK signal based at least in part on the comparison of the generated delayed CLK signal with the later phase of the chip's CLK signal.

FIG. 7 shows an operational flow diagram for on-chip circuitry, such as the example circuitry of FIG. 3, that is operable to generate a delayed CLK signal having an amount of delay relative to the chip's CLK signal that may vary responsive to changes in an observed operating voltage for the chip in accordance with at least one embodiment. As described further herein, such delayed signal may be used, for instance, in dynamically managing the frequency of the chip's CLK signal. In operational block 701, on-chip circuitry observes an operating voltage of the chip. For example, as described with FIG. 5, a delay element 301$_A$ may receive the chip's operating voltage. In operational block 702, on-chip circuitry receives a clock signal. For example, as also described with FIG. 5, delay element 301$_A$ may receive the chip's CLK signal as input. In operational block 703, on-chip circuitry generates a delayed clock signal having a delayed amount relative to the received clock signal, wherein the delayed amount is programmatically selectable to vary responsive to changes in the observed operating voltage. For example, as also described with FIG. 5, whether the amount of delay that is imparted by delay element 301$_A$ in generating the delayed CLK signal is to vary responsive to changes in the observed operating voltage can be programmatically set by a track signal that is supplied to such delay element.

FIG. 8 shows an operational flow diagram for implementing clock management circuitry on-chip such that the clock management circuitry is tailored, after fabrication of the chip, specifically for the chip, thus being capable to account for the specific characteristics (e.g., electrical characteristics, etc.) of the chip as-fabricated. In operational block 801, a chip is fabricated to include clock management circuitry, such as the example circuitry 104 of FIG. 1, for dynamically managing the chip's clock signal responsive to observed changes in the chip's variable operating voltage supply. In operational block 802, the clock management circuitry on the fabricated chip is programmed, for example using the track signal described above with FIGS. 3-5, to tailor its sensitivity to the observed changes in the chip's variable operating voltage. For instance, the track signal of FIGS. 3-5 may be used to tailor the clock management circuitry to be insensitive to observed changes in the chip's variable operating voltage (by disabling tracking mode for all of the delay elements), or such track signal may be set to a value to tailor the sensitivity of the clock management circuitry to the chip's variable operating voltage to any amount desired.

Embodiments described above provide a system and method for dynamically varying a clock signal. More specifically, certain embodiments provide a system and method in which the frequency of a circuit's (e.g., a chip's) clock signal is dynamically varied responsive to changes observed in the operating voltage of the circuit. In certain embodiments, delay line circuitry is provided that is operable to receive a clock signal and generate a delayed clock signal that is delayed from the clock signal by an amount that is based at least in part on the circuit's operating voltage. For instance, a chip's clock signal CLK is supplied to the chip's core circuitry 111 for use in performing clocked operations, and a variable operating voltage V1 is also supplied to the chip's core circuitry 111. The delay line circuitry 107 receives the clock signal CLK and may generate a delayed clock signal Delayed CLK based at least in part on the observed operating voltage V1 of the chip's core circuitry 111. The lower the variable operating voltage, the greater the amount of delay in the delayed clock signal relative to the chip's clock signal, for example. The delayed clock signal may then be compared to the clock signal (e.g., the delayed clock signal's phase may be compared to the clock signal's phase) to determine whether the frequency of the chip's clock signal should be adjusted (e.g., increased or decreased). Thus, the chip's clock frequency may be dynamically varied based on the observed operating voltage.

As described above, certain embodiments implement programmable delay line circuitry 107 for a chip 103, such as a microprocessor. Such programmable delay line circuitry 107 may include a plurality of delay circuits (or "elements"), such as delay element 301$_A$ described above in FIGS. 3 and 5, that may each be selectively activated for imposing a delay on the delayed clock signal based on the chip's variable operating voltage V1. Thus, the more delay elements that are selected for imparting a delay to the received clock signal, the greater the amount of delay that may be imparted to the resulting delayed clock signal. A control signal (or "track" signal) may be used to selectively control whether any one or more of the plurality of delay elements imparts a delay that varies responsive to variations in the chip's operating voltage V1. When a delay element is selected to have its delay amount vary responsive to the chip's operating voltage, it is referred to herein as operating in "tracking mode".

The speed of digital circuitry depends on various factors, including its operating voltage supply, operating temperature, and processing effects that occurred in its fabrication. For example, digital circuits generally run faster with increasing supply voltage and run slower with decreasing supply voltage. Thus, it may be desirable to dynamically optimize the frequency of a chip's clock signal for the chip's operating voltage at any given time. As described above, certain embodiments provide clock optimization circuitry (or "voltage-to-frequency conversion circuitry" or "clock management circuitry") on-chip for doing just that, i.e., for dynamically optimizing the frequency of the chip's clock signal for the chip's operating voltage (or "variable supply voltage") observed at any given time.

In accordance with certain embodiments, a programmable delay line is implemented for measuring the speed of digital circuitry. As described above, in certain embodiments, such programmable delay line 107 may be included within clock optimization circuitry 104 implemented on-chip for optimizing a chip's clock speed based on the chip's current operating voltage V1. For instance, in one example embodiment, the programmable delay line 107 is implemented on-chip, along with a phase comparator 109, and such circuitry is used to generate a signal to a system clock controller 110 to optimize the chip's clock frequency for a given operating voltage V1 that is observed for the chip. In various types of systems where measuring the speed of digital circuits may be desired, such a programmable delay line 107 may be implemented on the same die as the digital circuitry for effectively measuring the speed of the digital circuitry, and the results of such measurement may be utilized, for example, to dynamically change the speed (i.e., clock frequency) of the digital circuitry in a desired manner (e.g., in a manner that optimizes the clock frequency for power consumption control).

In operation of one embodiment of the clock optimization circuitry, a programmable delay line 107 is implemented on-chip to generate a delayed clock signal based at least in part on a variable operating voltage V1 that is supplied to the chip's core circuitry 111. For instance, a clock signal CLK is generated by a clock control circuit 110 and such clock signal CLK is provided to the chip's core circuitry 111 for use in performing its clocked operations. The clock signal CLK is also input to the programmable delay line circuitry 107, and based on the chip's variable operating voltage V1 (that is supplied to the chip's core circuitry), the programmable delay line circuitry 107 generates a delayed clock signal, Delayed CLK. For instance, the lower the operating voltage V1, the longer the delay of the delayed clock signal generated by the programmable delay line circuitry 107.

A phase comparator 109 may be utilized to compare the generated delayed clock signal to a next phase of the clock signal to determine whether the clock signal's frequency should be adjusted (e.g., increased or decreased), and the clock signal controller 110 may adjust the clock signal's frequency accordingly. Thus, in general, as the operating voltage V1 decreases, it may result in an increase in the delay of the delayed clock signal, which when compared with the frequency of the chip's clock signal may indicate that the clock signal is too fast and should thus be decreased (such that the decreased operating voltage V1 can support the clock signal's frequency). On the other hand, as the operating voltage V1 increases, it may result in a decrease in the delay of the delayed clock signal, which when compared with the frequency of the chip's clock signal may indicate that the clock signal is too slow and should thus be increased (such that the chip's clock runs at an optimum frequency that is supported by the increased operating voltage V1).

As mentioned above, in certain embodiments, the delay line circuitry 107 may be programmable through use of a "track" signal. For instance, as described with FIGS. 3-5 above, a plurality of delay elements may be implemented and a track signal may be used for specifying which, if any, of such delay elements are to be active for "tracking mode" operation. The more delay elements for which tracking mode is activated, the more sensitive the delay line circuitry 107 is to variations in the variable operating voltage V1. For instance, if tracking mode is active for one delay element, the delay of the delayed clock signal will increase as the operating voltage V1 decreases, and if tracking mode is active for two delay elements, the delay of the delayed clock signal will be more sensitive to changes in the operating voltage V1 (e.g., will cause a greater increase in the delay of the delayed clock signal for a given decrease in the operating voltage V1). Accordingly, such programmable delay line circuitry 107 may be programmed after the chip 103 is fabricated to tailor the delay specifically for such chip 103, thus accounting for the chip's true characteristics. That is, the sensitivity of the chip's clock signal to changes in the chip's operating voltage V1 may be programmed for tailoring such sensitivity for that specific chip 103.

As described with FIG. 5 above, in certain embodiments, each delay element implemented on-chip includes a transfer gate to which either a fixed supply voltage or the variable supply (operating) voltage is provided, depending on the value of the track signal. For instance, if the track signal associated with a delay element is set to 1 (for tracking mode active), then the variable operating voltage is provided to the transfer gate of that delay element, and if the track signal is set to 0 (for tracking mode not active), then the fixed voltage supply is provided to the transfer gate of that delay element. The supply voltage provided to the transfer gate effectively controls the transfer gate's resistance in order to control the amount of delay of an input signal (e.g., the chip's clock signal) to generate a delayed clock signal. For instance, if the variable operating voltage is provided to the transfer gate (i.e., when tracking mode is active for the delay element), the amount by which the input clock signal is delayed by that delay element increases as the operating voltage decreases and vice-versa.

What is claimed is:

1. A circuit comprising:
at least one delay element that is operable to receive a clock signal and generate a delayed clock signal having an amount of delay that varies based on an observed value of an operating voltage of said circuit;
wherein said at least one delay element receives said operating voltage and a fixed voltage, and said at least one delay element receives a track signal; and wherein said at least one delay element comprises a pass gate that is supplied the fixed voltage if the track signal is a first value, thereby maintaining a constant amount of delay in a delayed signal output by the at least one delay element, and said pass gate is supplied the operating voltage if the track signal is a second value, thereby varying the amount of delay in the delayed signal output by the at least one delay element.

2. The circuit of claim 1 further comprising:
clock control circuitry operable to dynamically control the frequency of the clock signal based at least in part on the delayed clock signal.

3. The circuit of claim 1 further comprising:
comparator circuitry for comparing a received clock signal with a generated delayed clock signal.

4. The circuit of claim 3 further comprising:
clock control circuitry operable to dynamically control the frequency of the clock signal based at least in part on the comparison of the received clock signal with a generated delayed clock signal.

5. The circuit of claim 1 comprising a plurality of delay elements and further comprising:

at least a first number of the delay elements that generate a first delayed signal having a first amount of delay relative to the received clock signal; and at least a second number of the delay elements that generate a second delayed signal having a second amount of delay relative to the received clock signal; and delay control circuitry operable to select either of said first or second delayed signals as said delayed clock signal.

6. The circuit of claim 5 further comprising:

a multiplexer that receives as input said first delayed signal and said second delayed signal, wherein said delay control circuitry controls which of said first and second delayed signals is output by said multiplexer.

7. The circuit of claim 1 further comprising:

core circuitry, wherein said clock signal is supplied to said core circuitry for use in synchronization of said core circuitry's operation.

8. The circuit of claim 7 wherein said operating voltage is supplied to said core circuitry.

9. The circuit of claim 1 further comprising:

track control circuitry that inputs a track signal to each of said at least one delay element to control whether an amount of delay in a delayed signal output by the respective delay element varies based on the observed value of said operating voltage.

10. The circuit of claim 1 further comprising:

a plurality of delay elements; and track control circuitry that inputs a track signal to each of said plurality of delay elements to control whether an amount of delay in a delayed signal output by the respective delay element varies based on the observed value of said operating voltage.

11. The circuit of claim 1 wherein said circuit is an integrated circuit.

12. A circuit comprising:

at least one delay element that is operable to receive a clock signal and generate a delayed clock signal having an amount of delay that varies based on an observed value of an operating voltage of said circuit;

a plurality of delay elements; and track control circuitry that inputs a track signal to each of said plurality of delay elements to control whether an amount of delay in a delayed signal output by the respective delay element varies based on the observed value of said operating voltage;

wherein if said track signal input to one of said plurality of delay elements is a first value, that delay element varies the amount of delay in a delay signal that it outputs based on the observed value of said operating voltage, and if said track signal input to that delay element is a different value than said first value, that delay element maintains a constant delay in a delay signal that it outputs.

13. The circuit of claim 12 wherein if said track signal input to said one of said plurality of delay elements is said first value, that delay element increases the amount of delay in the delay signal that it outputs responsive to a decrease in the observed value of said operating voltage and that delay element decreases the amount of delay in the delay signal that it outputs responsive to an increase in the observed value of said operating voltage.

14. Voltage-to-frequency conversion circuitry comprising:

at least one delay element that receives a clock signal and outputs a delayed clock signal having an amount of delay relative to the received clock signal, said at least one delay element including a transfer gate to which either a fixed voltage supply or a variable voltage supply is provided based on the value of a track signal, wherein when the variable voltage supply is provided to said transfer gate, the transfer gate varies the amount of said delay of the delayed clock signal responsive to changes in the variable voltage supply.

15. The voltage-to-frequency conversion circuitry of claim 14 further comprising:

comparator circuitry for comparing the clock signal with the delayed clock signal.

16. The voltage-to-frequency conversion circuitry of claim 15 further comprising:

clock control circuitry operable to dynamically control the frequency of the clock signal based at least in part on the comparison of the received clock signal with the delayed clock signal.

17. The voltage-to-frequency conversion circuitry of claim 14 further comprising:

a plurality of delay elements each operable to impart a delay to the received clock signal for generating the delayed clock signal.

18. The voltage-to-frequency conversion circuitry of claim 17 further comprising:

delay control circuitry for selecting a desired number of the plurality of delay elements to be used in imparting a delay to the received clock signal for generating the delayed clock signal.

19. The voltage-to-frequency conversion circuitry of claim 17 further comprising:

track control circuitry for inputting a track signal to each of the plurality of delay elements to control whether said transfer gate of each delay element varies the amount of delay imparted by the delay element to the received clock signal responsive to changes in the variable voltage supply.

20. The voltage-to-frequency conversion circuitry of claim 14 implemented on an integrated circuit, wherein said integrated circuit is supplied said variable voltage and said fixed voltage.

21. A method comprising:

receiving a first phase of a chip's clock signal into a delay line circuit of the chip;

generating with at least one delay element of the delay line circuit a delayed clock signal having a phase that is delayed relative to the first phase of the received clock signal;

comparing with comparison circuitry on the chip the generated delayed clock signal with a later phase of the chip's clock signal, the later phase of the chip's clock signal being later than the first phase of the chip's clock signal; and determining with clock control circuitry on the chip whether to change the frequency of the chip's clock signal, based at least in part on the comparison of the generated delayed clock signal with the later phase of the chip's clock signal;

wherein a plurality of delay elements are included in the delay line circuit, the method further comprising:

outputting with track control circuitry on the chip a track signal for controlling which ones of the plurality of delay elements are to dynamically change their respective delay that they impart to the received clock signal responsive to observed changes in a variable operating voltage of the chip.

22. The method of claim 21 wherein a plurality of delay elements are included in the delay line circuit, the method further comprising:

outputting with delay control circuitry on the chip a delay control signal for controlling which ones of the plurality of delay elements are to be used for imparting a delay to the received clock signal for generating the delayed clock signal.

23. The method of claim 21 wherein:

if the track signal has a first value, the amount of delay generated by a delay element receiving such track signal varies across a range of different operating voltages observed for the chip; and if the track signal has a second value, the amount of delay generated by the delay element receiving such track signal remains constant across said range of different operating voltages observed for the chip.

24. The method of claim 21 further comprising:

programming the at least one delay element regarding whether an amount of delay that the at least one delay element imparts to the received clock signal is sensitive to changes in a variable operating voltage of the chip.

25. The method of claim 21 further comprising:

generating with said at least delay element said delayed clock signal having said phase that is delayed relative to the first phase of the received clock signal by an amount that varies responsive to an observed operating voltage of the chip.

26. A method comprising:

observing with on-chip circuitry an operating voltage of a chip;

receiving a clock signal and generating a delayed clock signal having a delayed amount relative to the received clock signal with on-chip circuitry, wherein said delayed amount is programmatically selectable to vary responsive to changes in the observed operating voltage;

supplying said operating voltage to the chip;

supplying a fixed voltage to the chip; and selectively controlling whether a transfer gate included in the on-chip circuitry is provided the operating voltage or the fixed voltage, wherein when the transfer gate is provided the operating voltage the delayed amount of the delayed clock signal generated by the on-chip circuitry varies across a range of values observed for the operating voltage, and wherein when the transfer gate is provided the fixed voltage the delayed amount of the delayed clock signal generated by the on-chip circuitry remains constant across the range of values observed for the operating voltage.

27. The method of claim 26 wherein the on-chip circuitry includes at least one delay element that is used for imparting a delay to the received clock signal for generating the delayed clock signal, and wherein the on-chip circuitry includes track control circuitry that outputs a track signal for controlling whether a delay amount imparted by each of the at least one delay element varies responsive to the changes in the observed operating voltage.

28. A method comprising:

fabricating a chip that includes clock management circuitry for dynamically managing a clock signal of the chip responsive to observed changes in a variable operating voltage of the chip, wherein said clock management circuitry comprises at least one delay element, said at least one delay element receiving the chip's clock signal and imparting an amount of delay to the received clock signal for generating a delayed clock signal; and programming the clock management circuitry on the fabricated chip to tailor its sensitivity to said observed changes in the chip's variable operating voltage, wherein said programming comprises selectively controlling whether a transfer gate included in the at least one delay element is provided the variable operating voltage or a fixed voltage, wherein if the transfer gate is provided the variable operating voltage the delayed amount of the delayed clock signal generated by the at least one delay element varies across a range of values observed for the operating voltage, and wherein if the transfer gate is provided the fixed voltage the delayed amount of the delayed clock signal generated by the at least one delay element remains constant across the range of values observed for the operating voltage.

29. The method of claim 28 further comprising:

comparing the generated delayed clock signal with the chip's clock signal; and based at least in part on the comparison, determining whether to change the chip's clock signal's frequency.

* * * * *

UNITED STATES PATENT AND TRADEMARK OFFICE
CERTIFICATE OF CORRECTION

PATENT NO. : 7,394,301 B2
APPLICATION NO. : 11/155064
DATED : July 1, 2008
INVENTOR(S) : Eric S. Fetzer et al.

It is certified that error appears in the above-identified patent and that said Letters Patent is hereby corrected as shown below:

In column 8, line 37, delete "301c" and insert -- $301_c$ --, therefor.

In column 8, line 42, delete "301D" and insert -- $301_D$ --, therefor.

In column 8, line 61, delete "$301_A$-$302_D$" and insert -- $301_A$-$301_D$ --, therefor.

In column 9, line 15, delete "305B" and insert -- $305_B$ --, therefor.

In column 9, line 16, delete "305B" and insert -- $305_B$ --, therefor.

In column 11, line 39, delete "NFET" and insert -- nFET --, therefor.

In column 11, line 50, delete "NFET" and insert -- nFET --, therefor.

In column 12, line 26, delete "NFET" and insert -- nFET --, therefor.

In column 12, line 42, delete "NFET" and insert -- nFET --, therefor.

In column 13, line 7, delete "NFET" and insert -- nFET --, therefor.

Signed and Sealed this

Thirtieth Day of September, 2008

JON W. DUDAS
*Director of the United States Patent and Trademark Office*